(12) United States Patent
Deng et al.

(10) Patent No.: US 10,242,038 B2
(45) Date of Patent: Mar. 26, 2019

(54) TECHNIQUES FOR BLOCK-BASED INDEXING

(71) Applicant: INTEL CORPORATION, Santa Clara, CA (US)

(72) Inventors: Gang Deng, Beijing (CN); Xi Tang, Beijing (CN); Zhongyan Lu, Beijing (CN); Ting Lou, Beijing (CN); Tao Zhong, Beijing (CN); Heyuan Liu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 272 days.

(21) Appl. No.: 15/026,561

(22) PCT Filed: Nov. 28, 2013

(86) PCT No.: PCT/CN2013/088014
§ 371 (c)(1),
(2) Date: Mar. 31, 2016

(87) PCT Pub. No.: WO2015/077951
PCT Pub. Date: Jun. 4, 2015

(65) Prior Publication Data
US 2016/0246827 A1 Aug. 25, 2016

(51) Int. Cl.
*G06F 17/30* (2006.01)
*G06F 12/0884* (2016.01)

(52) U.S. Cl.
CPC .... *G06F 17/30324* (2013.01); *G06F 12/0884* (2013.01); *G06F 17/30138* (2013.01); *G06F 17/30486* (2013.01); *G06F 2212/22* (2013.01)

(58) Field of Classification Search
CPC .................................................. G06F 17/30321
See application file for complete search history.

(56) References Cited

U.S. PATENT DOCUMENTS

| | | |
|---|---|---|
| 5,551,027 A | 8/1996 | Choy et al. |
| 6,067,540 A | 5/2000 | Ozbutun et al. |
| 6,216,125 B1 * | 4/2001 | Johnson ............ G06F 17/30324 |
| 6,321,265 B1 * | 11/2001 | Najork .............. G06F 17/30902 |
| | | 707/E17.12 |
| 6,633,883 B2 | 10/2003 | Koskas |

(Continued)

OTHER PUBLICATIONS

Office Action received for Canadian Patent Application No. 2925030, dated Mar. 20, 2017, 3 pages.

(Continued)

*Primary Examiner* — Hung Q Pham

(57) ABSTRACT

Techniques for block-based indexing are described. In one embodiment, for example, an apparatus may comprise a multicore processor element, an assignment component for execution by the multicore processor element to generate a plurality of block-attribute pairs, each block-attribute pair corresponding to an attribute value and one of a plurality of data blocks, and an indexing component for execution by the multicore processor element to generate an index block for the plurality of data blocks based on the plurality of block-attribute pairs, the indexing component to perform parallel indexing of the plurality of block-attribute pairs using multiple indexing instances. Other embodiments are described and claimed.

23 Claims, 8 Drawing Sheets

(56) References Cited

U.S. PATENT DOCUMENTS

| | | | |
|---|---|---|---|
| 2004/0199530 A1 | 10/2004 | Avadhanam et al. | |
| 2008/0294863 A1* | 11/2008 | Faerber | H03M 7/3084 |
| | | | 711/170 |
| 2009/0063591 A1 | 3/2009 | Betten et al. | |
| 2011/0246432 A1 | 10/2011 | Yang et al. | |
| 2012/0011144 A1 | 1/2012 | Transier et al. | |
| 2014/0052734 A1* | 2/2014 | Lee | G06F 17/30312 |
| | | | 707/741 |
| 2014/0244690 A1* | 8/2014 | Vundavalli | G06F 17/30289 |
| | | | 707/790 |

OTHER PUBLICATIONS

International Search Report dated Sep. 11, 2014 in International Patent Application No. PCT/CN2013/088014.
Extended European Search Report received for European Patent Application No. 138981824, dated Jun. 8, 2017, 7 pages.

\* cited by examiner

Storage Medium 500

*Computer Executable Instructions for 400*

*FIG. 5*

TECHNIQUES FOR BLOCK-BASED INDEXING

TECHNICAL FIELD

Embodiments described herein generally relate to implementation and management of computer-implemented data stores.

BACKGROUND

One type of data store that may conventionally be used to implement storage and maintenance of large datasets is a block-based data store. In a block-based data store, data such as key-value records are stored in data blocks that are optimized for sequential access from storage. In order to enable the performance of queries of a block-based data store, indices may be constructed that are associated with various attributes, values, or other information in the data store. To date, the development of indexing techniques for block-based data stores has focused mainly on maximizing query speed for complete, static sets of data blocks. Thus, conventional techniques commonly regard indexing as a one-time process performed upon importation of a complete dataset. Such conventional techniques typically do not prioritize indexing speed and/or efficiency, and may not enable efficient incremental indexing of dynamic datasets.

In a wide variety of real-world applications, indexing speed and/or efficiency may be important considerations, as may be the ability to incrementally index a dataset that is constantly changing. Some dynamic block-based data stores may continually receive and incorporate new records, in some cases millions or even billions of times per second. As such, techniques for efficient incremental indexing of block-based data stores may be desirable.

BRIEF DESCRIPTION OF THE DRAWINGS

FIG. 5 illustrates one embodiment of a storage medium.

DETAILED DESCRIPTION

Various embodiments may be generally directed to techniques for block-based indexing. In one embodiment, for example, an apparatus may comprise a multicore processor element, an assignment component for execution by the multicore processor element to generate a plurality of block-attribute pairs, each block-attribute pair corresponding to an attribute value and one of a plurality of data blocks, and an indexing component for execution by the multicore processor element to generate an index block for the plurality of data blocks based on the plurality of block-attribute pairs, the indexing component to perform parallel indexing of the plurality of block-attribute pairs using multiple indexing instances. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
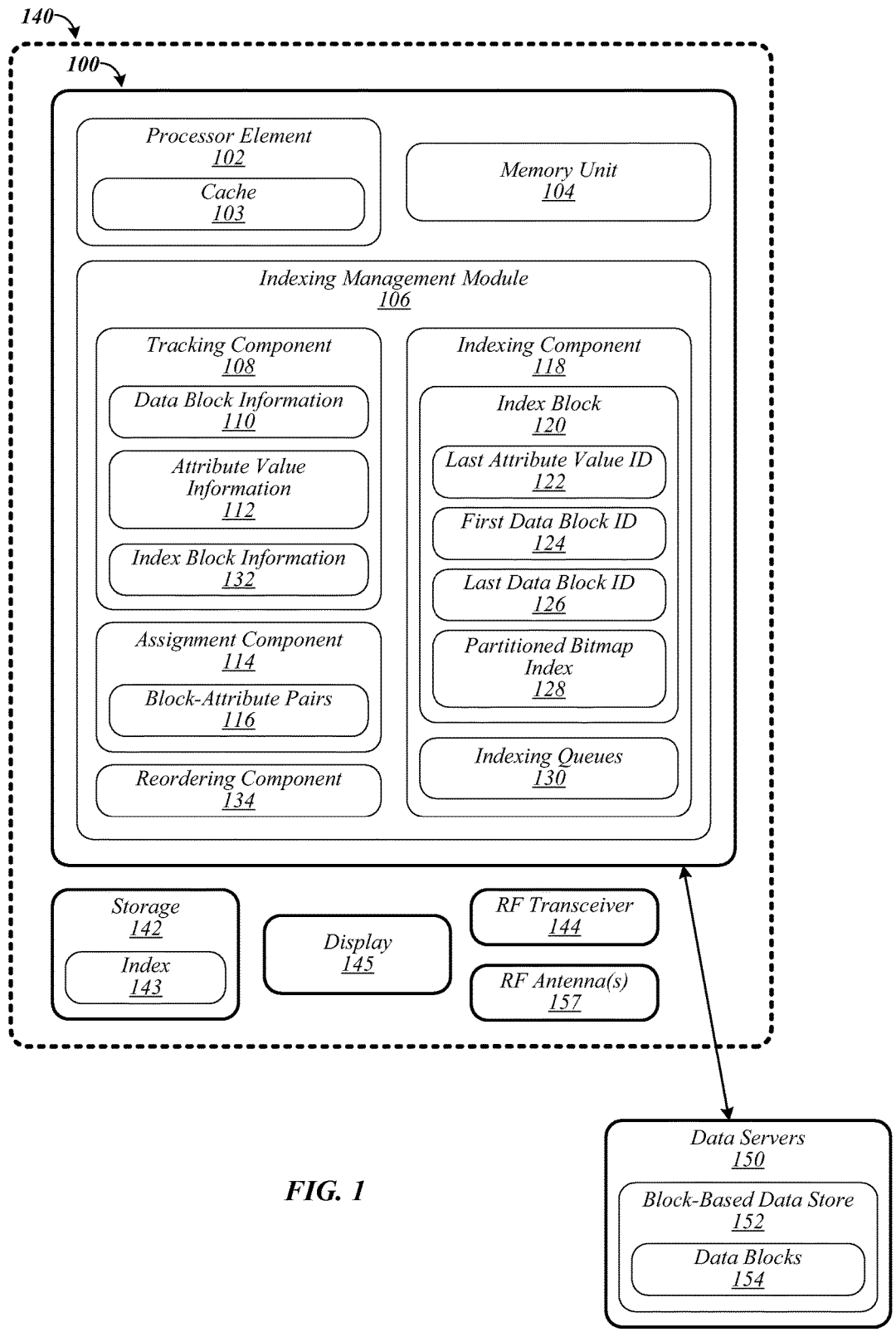
FIG. 1 illustrates one embodiment of an apparatus and one embodiment of a first system.

FIG. 1 illustrates a block diagram of an apparatus 100. Apparatus 100 comprises an example of an apparatus that may implement improved indexing techniques for a block-based data store. More particularly, in various embodiments, apparatus 100 may be operative to implement block-based indexing techniques according to which multiple processing cores operate in parallel to efficiently construct index blocks for a block-based data store. As shown in FIG. 1, apparatus 100 comprises multiple elements including a processor element 102, a memory unit 104, and an indexing management module 106. The embodiments, however, are not limited to the type, number, or arrangement of elements shown in this figure.

In some embodiments, apparatus 100 may comprise processor element 102. Processor element 102 may be implemented using any processor or logic device capable of implementing task-level parallelism. In various such embodiments, processor element 102 may comprise a multi-core processor chip or other package comprising a plurality of processing cores. In some embodiments, processor element 102 may comprise cache 103. In various embodiments, cache 103 may comprise volatile memory operative to store data generated by and/or for processing by processor element 102. In some embodiments in which processor element 102 comprises multiple processing cores, some or all of cache 103 may be accessible by each of the multiple processing cores. In various other embodiments, each portion of cache 103 may be accessible only by a particular one of the multiple processing cores. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor element 102, or alternatively some portion or all of memory unit 104 may be disposed on an integrated circuit or other medium, for example a hard disk drive, that is external to the integrated circuit of processor element 102. Although memory unit 104 is comprised within apparatus 100 in FIG. 1, memory unit 104 may be external to apparatus 100 in some embodiments. The embodiments are not limited in this context.

In various embodiments, apparatus 100 may comprise an indexing management module 106. Indexing management module 106 may comprise logic, circuitry, and or instructions operative to perform indexing operations for a block-based data store 152. In some embodiments, indexing management module 106 may be operative to implement one or more block-based indexing techniques. In various embodiments, indexing management module 106 may be operative to implement one or more such techniques in such fashion as to utilize parallel processing capabilities of processor element 102. The embodiments are not limited in this context.

FIG. 1 also illustrates a block diagram of a system 140. System 140 may comprise any of the aforementioned elements of apparatus 100. System 140 may further comprise one or more additional components. For example, in some embodiments, system 140 may comprise storage 142. Storage 142 may be implemented as one or more non-volatile and/or volatile storage devices. In some embodiments, for example, storage 142 may comprise one or more hard disks. Additional examples of storage devices that may be comprised in storage 142 may include, without limitation, optical storage media such as digital video discs (DVDs), removable magnetic storage media such as floppy disks, tape storage media, flash memory, and/or magneto-optical storage media. Further examples of storage devices that may be comprised in storage 142 may include, without limitation, volatile memory devices such as RAM, DRAM, SRAM, and/or SDRAM, and/or any of the other examples mentioned above with respect to memory unit 104. In some embodiments, system 140 may comprise a server, and storage 142 may comprise a main memory of that server. The embodiments are not limited in this context.

In various embodiments, system 140 may comprise a radio frequency (RF) transceiver 144. RF transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 144 may operate in accordance with one or more applicable standards in any version. The embodiments are not limited in this context.

In some embodiments, system 140 may comprise one or more RF antennas 157. Examples of any particular RF antenna 157 may include an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. The embodiments are not limited to these examples.

In various embodiments, system 140 may include a display 145. Display 145 may comprise any display device capable of displaying information received from processor element 102. Examples for display 145 may include a television, a monitor, a projector, and a computer screen. In one embodiment, for example, display 145 may be implemented by a liquid crystal display (LCD), light emitting diode (LED) or other type of suitable visual interface. Display 145 may comprise, for example, a touch-sensitive display screen ("touchscreen"). In various implementations, display 145 may comprise one or more thin-film transistors (TFT) LCD including embedded transistors. The embodiments are not limited in this context.

In general operation, apparatus 100 and/or system 140 may be operative to perform indexing of a block-based data store 152. More particularly, in various embodiments, apparatus 100 and/or system 140 may be operative to implement block-based indexing techniques for block-based data store 152. In some embodiments, such techniques may make use of parallel processing capabilities of processor element 102 in conjunction with efficient incremental indexing of the block-based data store 152. The embodiments are not limited in this context.

In various embodiments, apparatus 100 and/or system 140 may communicate with one or more servers 150 which may collectively house block-based data store 152. For example, in some embodiments, block-based data store 152 may comprise a distributed data store housed on a plurality of data servers 150, and apparatus 100 and/or system 140 may communicate with the plurality of data servers 150 via one or more wired and/or wireless network connections. In various embodiments, block-based data store 152 may comprise a plurality of data blocks 154, each of which may comprise a plurality of values, attributes, and/or other information elements. The embodiments are not limited in this context.

In some embodiments, apparatus 100 and/or system 140 may be operative to implement block-based indexing techniques according to which one or more index blocks 120 are generated. In various embodiments, each index block 120 may comprise indexing information for one or more data blocks 154. In some embodiments, each index block 120 may facilitate queries of its associated data blocks 154. The embodiments are not limited in this context.

In various embodiments, indexing management module 106 may comprise a tracking component 108. Tracking component 108 may comprise logic, circuitry, and/or instructions operative to maintain one or more types of descriptive information regarding block-based data store 152. In some embodiments, tracking component 108 may be operative to maintain data block information 110. Data block information 110 may comprise information identifying and/or describing the data blocks 154 in block-based data store 152. For example, in various embodiments, data block information 110 may comprise information indicating an identifier for each data block 154 in block-based data store 152. In some embodiments, each data block 154 may have an associated data block number according to a defined sequence for data blocks 154, and data block information 110 may comprise information indicating the data block number for each data block 154. In various embodiments, the identifiers and/or data block numbers for data blocks 154 may comprise global parameters, such that each identifier and/or data block number is unique across all the data blocks 154 of all of data servers 150. In some embodiments, each time apparatus 100 and/or system 140 receives a data block 154 for indexing, tracking component 110 may be operative to insert into data block information 110 an entry that indicates an identifier and/or data block number for that data block 154. The embodiments are not limited in this context.

In various embodiments, tracking component 108 may be operative to maintain attribute value information 112. Attribute value information 112 may comprise information identifying and/or describing various attribute values that may be comprised in and/or associated with one or more data blocks 154. Examples of such attribute values may include, without limitation, names, ages, genders, addresses, phone numbers, and/or locations. In some embodiments, attribute value information 112 may comprise information indicating an identifier for each distinct attribute value associated with any data block 154 in block-based data store 152. In various embodiments, each distinct attribute value may have an associated attribute value number according to a defined sequence of attribute values, and attribute value information 112 may comprise information indicating the attribute value number for each distinct attribute value. In some embodiments, the attribute value identifiers and/or attribute value numbers may comprise global parameters, such that each attribute value identifier and/or attribute value number is unique across all the distinct attribute values associated with all of the data blocks 154 of all of data servers 150. In various embodiments, each time apparatus 100 and/or system 140 receives a data block 154 for indexing, tracking component 108 may be operative to determine whether the data block 154 comprises any attribute values that are not already represented within attribute value information 112. In some embodiments, when it determines that a data block 154 comprises one or more attribute values that are not already represented within attribute value information 112, tracking component 108 may be operative to insert into attribute value information 112 one or more entries that indicate respective identifiers and/or attribute value numbers for those one or more attribute values. The embodiments are not limited in this context.

In various embodiments, indexing management module 106 may comprise an assignment component 114. Assignment component 114 may comprise logic, circuitry, and/or instructions operative to generate block-attribute pairs 116 for data blocks 154. Block-attribute pairs 116 may comprise information elements indicating associations between particular attribute values and particular data blocks 154. In some embodiments, each block-attribute pair 116 may identify a particular data block 154 and an attribute value associate with that data block 154. In various embodiments, each block-attribute pair 116 may comprise a data block number for a data block 154 and an attribute value number for an attribute value associated with that data block 154. In some embodiments, assignment component 114 may be operative to generate block-attribute pairs 116 using data block information 110 and attribute value information 112. In various embodiments, assignment component 114 may be operative to assign data block numbers to data blocks 154 prior to generating block-attribute pairs 116 for those data blocks 154. In some embodiments, for example, assignment component 114 may be operative to receive a plurality of data blocks 154, assign data block numbers to each of the plurality of data blocks 154, and generate a plurality of block-attribute pairs 116 for the plurality of data blocks 154, and each of the plurality of block-attribute pairs 116 may correspond to an attribute value and one of the plurality of data blocks 154. In various embodiments, assignment component 114 may be operative to establish multiple assignment instances and may perform parallel generation of multiple block-attribute pairs 116 using the multiple assignment instances. In some embodiments, assignment component 114 may be operative to establish each assignment instance on a respective one of multiple processing cores of processor element 102. The embodiments are not limited in this context.

In various embodiments, indexing management module 106 may comprise an indexing component 118. Indexing component 118 may comprise logic, circuitry, and/or instructions operative to generate one or more index blocks 120. In some embodiments, each index block 120 may comprise indexing information for a respective plurality of data blocks 154. In various embodiments, each index block 120 may comprise a last attribute value identifier (ID) 122. Last attribute value ID 122 may comprise information identifying a highest attribute value number comprised in attribute value information 112 at the time of creation of the index block 120. In some embodiments, each index block 120 may comprise a first data block ID 124. First data block ID 124 may comprise information identifying a data block number of a first data block 154 indexed in the index block 120. In various embodiments, each index block 120 may comprise a last data block ID 126. Last data block ID 126 may comprise information identifying a data block number of a last data block 154 indexed in the index block 120. The embodiments are not limited in this context.

In some embodiments, each index block 120 may comprise a bitmap index block (BIB) that contains a partitioned bitmap index 128 describing a plurality of data blocks 154 indexed in that index block 120. In various embodiments, partitioned bitmap index 128 may comprise information indicating, for each of a plurality of attribute values, whether each of a plurality of data blocks 154 comprises and/or is associated with that attribute value. In some embodiments, the plurality of attribute values may be defined by last attribute value ID 122. For example, in various embodiments, the plurality of attribute values may comprise each attribute value in attribute value information 112 that comprises an attribute value number that is less than or equal to last attribute value ID 122. In some embodiments, the plurality of data blocks 154 may be defined by first data block ID 124 and last data block ID 126. For example, in various embodiments, the plurality of data blocks 154 may comprise each data block 154 that data block information 110 identifies as having a data block number between first data block ID 124 and last data block ID 126, inclusive. The embodiments are not limited in this context.

In some embodiments, partitioned bitmap index 128 may comprise a data structure in which one dimension corresponds to the plurality of data blocks 154 and another dimension corresponds to the plurality of attribute values. In various embodiments, for example, partitioned bitmap index 128 may comprise a row for each of the plurality of attribute values and may comprise a column for each of the plurality of data blocks 154. In some embodiments, each element in partitioned bitmap index 128 may correspond to a particular attribute value number and a particular data block number. In various such embodiments, each element may indicate whether the data block 154 identified by its corresponding data block number comprises and/or is associated with the attribute value identified by its corresponding attribute value number. In some embodiments, for example, each row in partitioned bitmap index 128 may define an attribute value and each column may define a data block 154, and each element may comprise a bit indicating whether the data block 154 defined by its column comprises and/or is associated with the attribute value defined by its row. The embodiments are not limited to this example.

In various embodiments, assignment component 114 may be operative to generate a plurality of block-attribute pairs 116 for a plurality of data blocks 154, and indexing component 118 may be operative to generate a partitioned bitmap index 128 for the plurality of data blocks 154 using the plurality of block-attribute pairs 116. In some embodiments, each block-attribute pair 116 may indicate that a particular data block 154 comprises and/or is associated with a particular attribute value, and indexing component 118 may be operative to set the value of an element in partitioned bitmap index 128 to reflect this relationship. In various embodiments, indexing component 118 may be operative to perform parallel indexing of the plurality of block-attribute pairs 116. In some embodiments, for example, indexing component 118 may be operative to establish multiple indexing instances, and may perform parallel indexing according to which multiple block-attribute pairs 116 are concurrently indexed using the multiple indexing instances. In various embodiments, indexing component 118 may be operative to establish each indexing instance on a respective one of multiple processing cores of processor element 102. The embodiments are not limited in this context.

In some embodiments, indexing component 118 may be operative to perform parallel indexing using a plurality of indexing queues 130. In various embodiments, the plurality of indexing queues 130 may be comprised in cache 103. In some embodiments, indexing component 118 may be operative to establish a separate indexing queue 130 for each indexing instance that it establishes. As such, in various embodiments, the number of indexing queues 130 may be equal to the number of indexing instances used by indexing component 118. In some embodiments, each indexing instance may be operative to process only the block-attribute pairs 116 comprised in its corresponding indexing queue 130. In various embodiments, indexing component 118 may be operative to place each block-attribute pair 116 in one of the plurality of indexing queues 130. In some embodiments, indexing component 118 may be operative to place each block-attribute pair 116 in an indexing queue 130 based on the attribute value number comprised in that block-attribute pair 116.

In various embodiments, indexing component 118 may be operative to determine a corresponding indexing queue 130 for each attribute value number based on mapping function. In some embodiments, for each attribute value number, the mapping function may specify a single corresponding indexing queue 130, such that each attribute value number maps to one and only one indexing queue 130. In various embodiments, the mapping function may comprise performing a modulo operation and assigning an indexing queue 130 based on the result, where each possible result of the modulo operation corresponds to a respective one of the indexing queues 130. In some embodiments, for example, in order to determine an indexing queue 130 into which to place a particular block-attribute pair 116, indexing component 118 may be operative to divide an attribute value number of that block-attribute pair 116 by the number of indexing queues 130 and to assign the block-attribute pair 116 to an indexing queue 130 corresponding to the resulting remainder. The embodiments are not limited to this example.

In various embodiments, during ongoing indexing operations, each indexing instance may be operative to retrieve block-attribute pairs 116 from its corresponding indexing queue 130 and update partitioned bitmap index 128 based on those block-attribute pairs 116. In some embodiments, since each attribute value number maps to a particular indexing queue 130 and each indexing queue 130 is processed by a particular indexing instance, each block-attribute pair 116 comprising a particular attribute value number may be processed by a same indexing instance. In various such embodiments, each row in partitioned bitmap index 128 may correspond to a particular attribute value number, and each row may therefore be handled by a particular indexing instance. One advantage associated with some embodiments may be that by mapping block-attribute pairs 116 to indexing queues 130 in such a fashion that each row in partitioned bitmap index 128 is handled by a particular indexing instance, cache line conflicts and/or redundant caching operations between indexing instances may be avoided and/or reduced, and performance may be increased. Other advantages may be associated with various embodiments, and the embodiments are not limited in this context.

In some embodiments, each time indexing component 118 generates an index block 120, tracking component 108 may be operative to assign an index block identifier and/or an index block number to that index block 120. In various embodiments, tracking component 108 may be operative to maintain index block information 132 identifying index blocks 120 that have been generated by indexing component 118. In some embodiments, each time indexing component 118 generates an index block 120, tracking component 108 may be operative to add an entry to index block information 132 that identifies that index block 120 and comprises an index block identifier and an index block number for that index block 120. In various embodiments, each index block identifier may comprise a unique index block identifier, and/or each index block number may comprise a unique index block number. The embodiments are not limited in this context.

In various embodiments, indexing management module 106 may comprise a reordering component 134. Reordering component 134 may comprise logic, circuitry, and/or instructions operative to reorder partitioned bitmap indexes 128 in conjunction with storage of index blocks 120 in an index 143. In some embodiments, during generation of any particular index block 120, indexing component 118 may be operative to store generated portions of the partitioned bitmap index 128 for that index block 120 in cache 103. In various embodiments, various portions of partitioned bitmap index 128 may be stored in various non-contiguous memory regions of cache 103, and may not necessarily be stored in sequential order. In some embodiments, in conjunction with movement of the index block 120 to index 143, reordering component 134 may be operative to reorder the portions of partitioned bitmap index 128 in cache 103 such that they are stored in sequential order in a continuous memory space of storage 142. One advantage associated with various embodiments may be that reordering partitioned bitmap indexes 128 in this fashion enables efficient querying of the various index blocks 120 in index 143. Other advantages may be associated with some embodiments, and the embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 2:
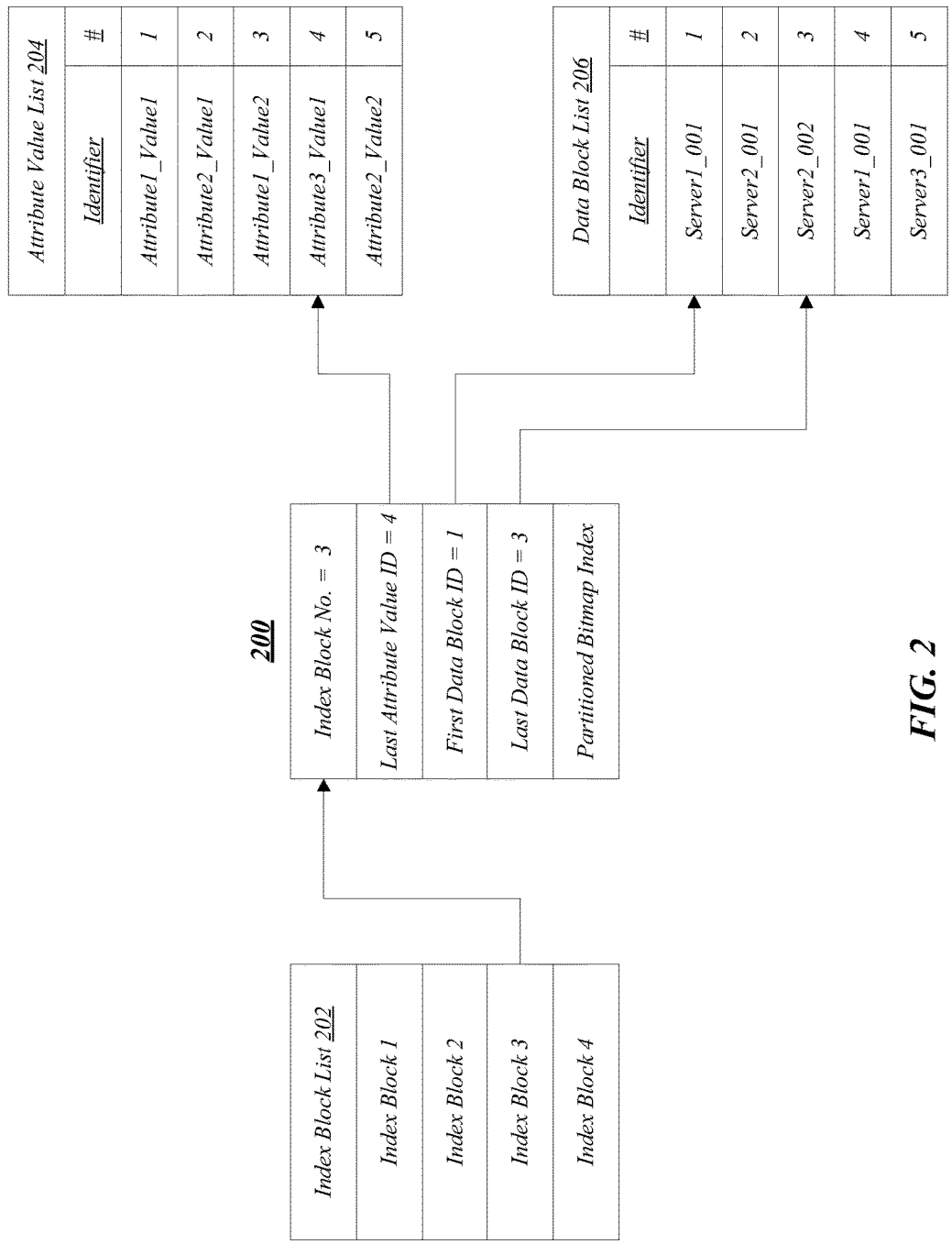
FIG. 2 illustrates one embodiment of an index block.

FIG. 2 illustrates one embodiment of an index block 200. Index block 200 comprises an example of an index block that may be generated by apparatus 100 and/or system 140 of FIG. 1, such as an index block 120. As shown in FIG. 2, index block 200 is identified by an entry in an index block list 202, which may comprise an example of index block information 132 of FIG. 1. More particularly, index block 200 comprises an index block that is identified as "Index Block 3" in index block list 202. Index block 200 comprises a first field indicating that its associated index block number is equal to 3. Index block 200 further comprises a second field that comprises an example of last attribute value ID 122 of FIG. 1, and that indicates that the attribute value number associated with the last attribute value reflected in index block 200 is equal to 4. As shown in attribute value list 204, which may comprise an example of attribute value information 112 of FIG. 1, the attribute value number 4 is associated with the attribute value corresponding to the attribute value ID "Attribute3_Value1."

Index block 200 further comprises a third field that comprises an example of first data block ID 124 of FIG. 1, and that indicates that the data block number associated with the first data block indexed in index block 200 is equal to 1. As shown in data block list 206, which may comprise an example of data block information 110 of FIG. 1, the data block number 1 is associated with the data block corresponding to the data block ID "Server1_001." Index block 200 further comprises a fourth field that comprises an example of last data block ID 126 of FIG. 1, and that indicates that the data block number associated with the last data block indexed in index block 200 is equal to 3. As shown in data block list 206, the data block number 3 is associated with the data block corresponding to the data block ID "Server2_002." Index block 200 further comprises a partitioned bitmap index, which may comprise an example of partitioned bitmap index 128 of FIG. 1. The embodiments are not limited to these examples.

Figure 3:
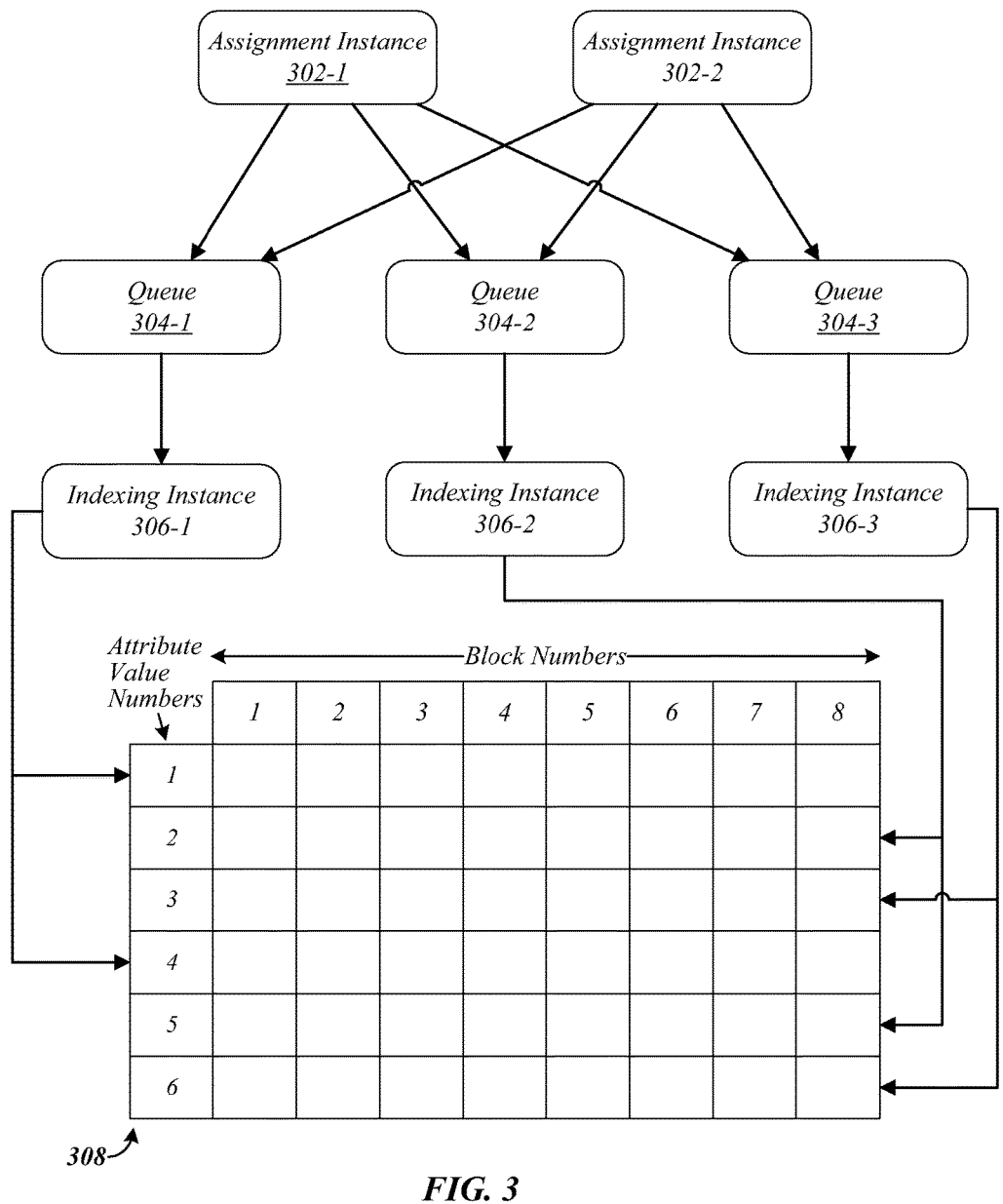
FIG. 3 illustrates one embodiment of a parallel indexing architecture.

FIG. 3 illustrates one embodiment of a parallel indexing architecture 300. Parallel indexing architecture 300 comprises an example of an indexing architecture that may be implemented by apparatus 100 and/or system 140 of FIG. 1. As shown in FIG. 3, parallel indexing architecture 300 comprises assignment instances 302-1 and 302-2, such as may be established by assignment component 114 of FIG. 1. Assignment instances 302-1 and 302-2 both generate block-attribute pairs and distribute them among queues 304-1, 304-2, and 304-3, which may comprise examples of indexing queues 130 of FIG. 1. In various embodiments, assignment instances 302-1 and 302-2 may distribute block-attribute pairs among queues 304-1, 304-2, and 304-3 based on attribute value numbers associated with those block-attribute pairs. For example, assignment instances 302-1 and 302-2 may distribute block-attribute pairs based on the results of modulo operations performed on the attribute value numbers associated with those block-attribute pairs.

The block-attribute pairs in queues 304-1, 304-2, and 304-3 are processed by respective indexing instances 306-1, 306-2, and 306-3, such as may be established by indexing component 118 of FIG. 1. More particularly, based on the block-attribute pairs that they process, indexing instances 306-1, 306-2, and 306-3 insert information into elements in various rows of partitioned bitmap index 308, which may comprise an example of partitioned bitmap index 128 of FIG. 1. Each row in partitioned bitmap index 308 corresponds to a particular attribute value number, and each column corresponds to a particular data block number. Because block-attribute pairs are mapped to queues 304-1, 304-2, and 304-3 based on their associated attribute value numbers and each of indexing instances 306-1, 306-2, and 306-3 processes block-attribute pairs from a particular one of queues 304-1, 304-2, and 304-3, each row in partitioned bitmap index 308 is exclusively handled by a particular one of indexing instances 306-1, 306-2, and 306-3. In the example of FIG. 3, indexing instance 306-1 inserts information into the first and fourth rows of partitioned bitmap index 308, indexing instance 306-2 inserts information into the second and fifth rows of partitioned bitmap index 308, and indexing instance 306-3 inserts information into the third and sixth rows of partitioned bitmap index 308. The embodiments are not limited to this example.

It is to be understood that although partitioned bitmap index 308 is structured such that rows correspond to attribute value numbers and columns correspond to data block numbers, the embodiments are not limited to this example implementation. In some embodiments, partitioned bitmap indexes may be structured such that rows correspond to data block numbers and columns correspond to attribute value numbers. Furthermore, it will be appreciated that the terms "row" and "column" are simply examples of nomenclature that may be used to refer to different dimensions of a data structure such as partitioned bitmap index 308, and may not be applicable to various embodiments. For example, in some embodiments, partitioned bitmap indexes may be constructed that comprise two dimensional data arrays, where one array dimension corresponds to attribute value numbers and another dimension corresponds to data block numbers. The embodiments are not limited in this context.

Figure 4:
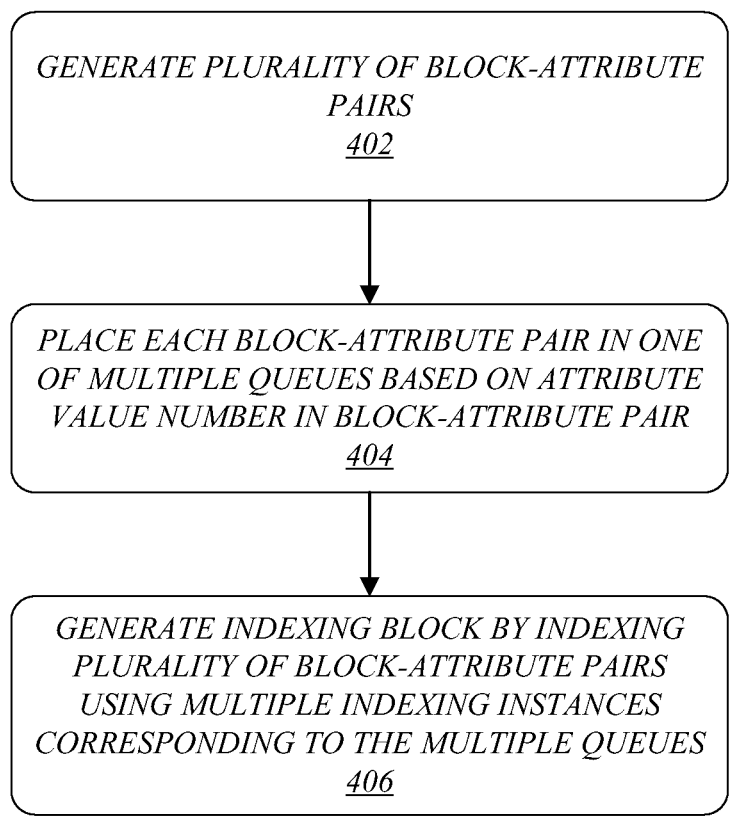
FIG. 4 illustrates one embodiment of a logic flow.

FIG. 4 illustrates one embodiment of a logic flow 400, which may be representative of the operations executed by one or more embodiments described herein. As shown in logic flow 400, a plurality of block-attribute pairs may be generated at 402. For example, assignment component 114 of FIG. 1 may be operative to generate a plurality of block-attribute pairs 116, each of which corresponds to an attribute value and one of a plurality of data blocks 154. At 404, each block-attribute pair may be placed in one of multiple queues based on an attribute value number in that block-attribute pair. For example, assignment component 114 of FIG. 1 may be operative to place each of the plurality of block-attribute pairs 116 in one of a plurality of indexing queues 130 based on an attribute value number comprised in that block-attribute pair 116. At 406, an indexing block may be generated by indexing the plurality of block-attribute pairs using multiple indexing instances corresponding to the multiple queues. For example, indexing component 118 of FIG. 1 may be operative to establish a plurality of indexing instances and to index the plurality of block-attribute pairs 116 using the plurality of indexing instances, and each of the plurality of indexing instances may index block-attribute pairs 116 from a respective one of the plurality of indexing queues 130. The embodiments are not limited to these examples.

FIG. 5 illustrates an embodiment of a storage medium 500. Storage medium 500 may comprise any non-transitory computer-readable storage medium or machine-readable storage medium, such as an optical, magnetic or semiconductor storage medium. In various embodiments, storage medium 500 may comprise an article of manufacture. In some embodiments, storage medium 500 may store computer-executable instructions, such as computer-executable instructions to implement logic flow 400 of FIG. 4. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 6:
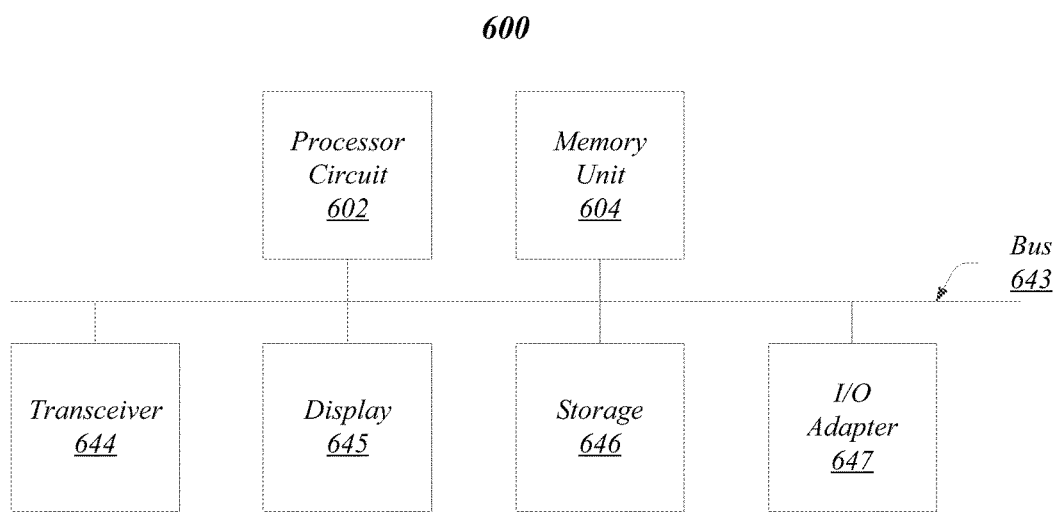
FIG. 6 illustrates one embodiment of a second system.

FIG. 6 illustrates one embodiment of a system 600. In various embodiments, system 600 may be representative of a system or architecture suitable for use with one or more embodiments described herein, such as apparatus 100 and/or system 140 of FIG. 1, parallel indexing architecture 300 of FIG. 3, logic flow 400 of FIG. 4, and/or storage medium 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a processor element 602. Processor element 602 may be implemented using any processor or logic device, and may be the same as or similar to processor element 102 of FIG. 1.

In one embodiment, system 600 may include a memory unit 604 to couple to processor element 602. Memory unit 604 may be coupled to processor element 602 via communications bus 643, or by a dedicated communications bus between processor element 602 and memory unit 604, as desired for a given implementation. Memory unit 604 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 600 may include an RF transceiver 644. RF transceiver 644 may include one or more radios capable of transmitting and receiving signals using various suitable wireless communications techniques, and may be the same as or similar to RF transceiver 144 of FIG. 1.

In various embodiments, system 600 may include a display 645. Display 645 may comprise any display device capable of displaying information received from processor element 602, and may be the same as or similar to display 145 of FIG. 1. The embodiments are not limited in this context.

In various embodiments, system 600 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 600 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
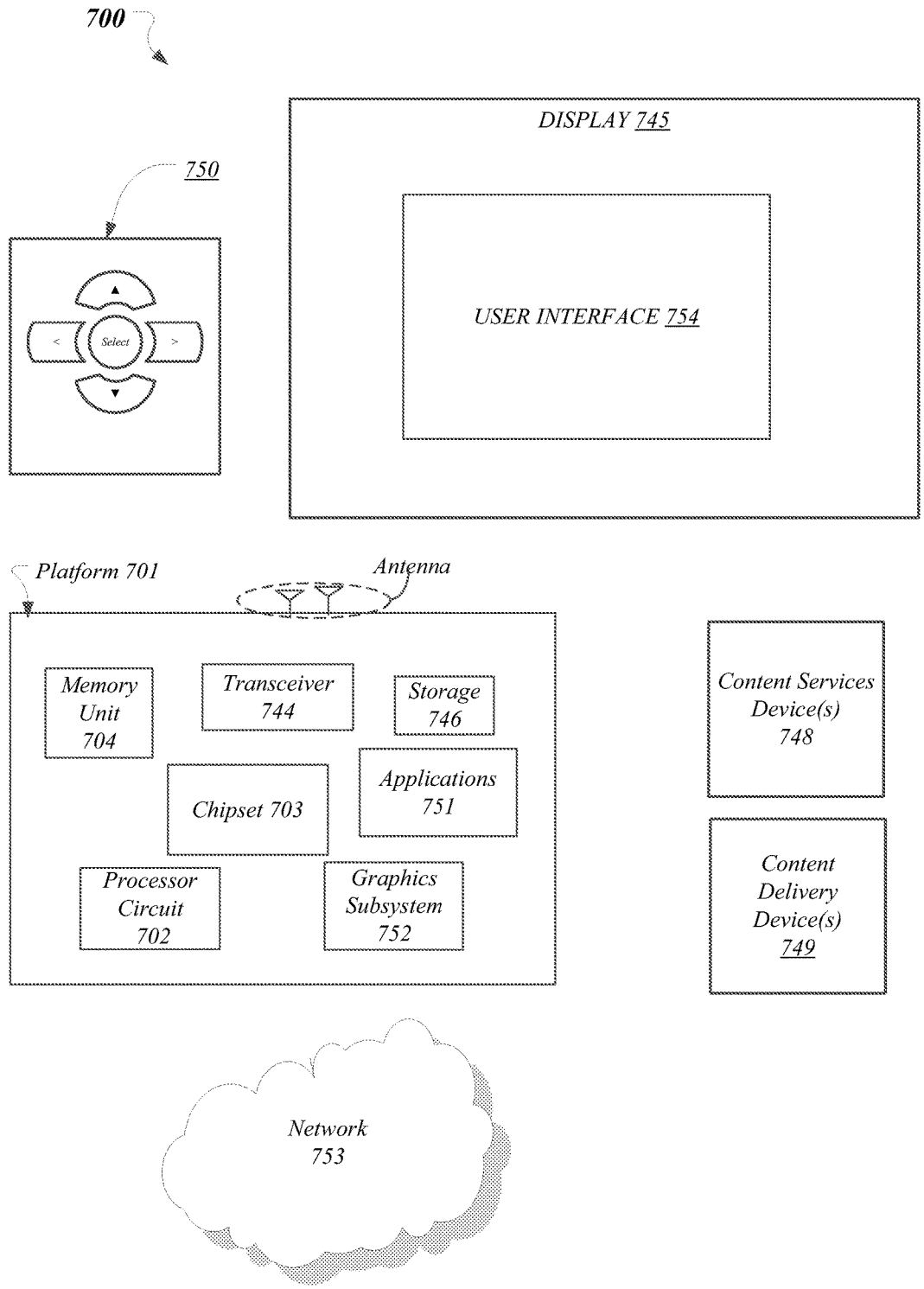
FIG. 7 illustrates one embodiment of a third system.

FIG. 7 illustrates an embodiment of a system 700. In various embodiments, system 700 may be representative of a system or architecture suitable for use with one or more embodiments described herein, such as apparatus 100 and/or system 140 of FIG. 1, parallel indexing architecture 300 of FIG. 3, logic flow 400 of FIG. 4, storage medium 500 of FIG. 5, and/or system 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 701 coupled to a display 745. Platform 701 may receive content from a content device such as content services device(s) 748 or content delivery device(s) 749 or other similar content sources. A navigation controller 750 including one or more navigation features may be used to interact with, for example, platform 701 and/or display 745. Each of these components is described in more detail below.

In embodiments, platform 701 may include any combination of a processor element 702, chipset 703, memory unit 704, transceiver 744, storage 746, applications 751, and/or graphics subsystem 752. Chipset 703 may provide intercommunication among processor element 702, memory unit 704, transceiver 744, storage 746, applications 751, and/or graphics subsystem 752. For example, chipset 703 may include a storage adapter (not depicted) capable of providing intercommunication with storage 746.

Processor element 702 may be implemented using any processor or logic device, and may be the same as or similar to processor element 602 in FIG. 6.

Memory unit 704 may be implemented using any machine-readable or computer-readable media capable of storing data, and may be the same as or similar to memory unit 604 in FIG. 6.

Transceiver 744 may include one or more radios capable of transmitting and receiving signals using various suitable wireless communications techniques, and may be the same as or similar to transceiver 644 in FIG. 6.

Display 745 may include any television type monitor or display, and may be the same as or similar to display 645 in FIG. 6.

Storage 746 may be implemented as a non-volatile storage device, and may be the same as or similar to storage 646 in FIG. 6.

Graphics subsystem 752 may perform processing of images such as still or video for display. Graphics subsystem 752 may be a graphics processing unit (GPU) or a visual processing unit (VPU), for example. An analog or digital interface may be used to communicatively couple graphics subsystem 752 and display 745. For example, the interface may be any of a High-Definition Multimedia Interface, DisplayPort, wireless HDMI, and/or wireless HD compliant techniques. Graphics subsystem 752 could be integrated into processor element 702 or chipset 703. Graphics subsystem 752 could be a stand-alone card communicatively coupled to chipset 703.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 748 may be hosted by any national, international and/or independent service and thus accessible to platform 701 via the Internet, for example. Content services device(s) 748 may be coupled to platform 701 and/or to display 745. Platform 701 and/or content services device(s) 748 may be coupled to a network 753 to communicate (e.g., send and/or receive) media information to and from network 753. Content delivery device(s) 749 also may be coupled to platform 701 and/or to display 745.

In embodiments, content services device(s) 748 may include a cable television box, personal computer, network, telephone, Internet enabled devices or appliance capable of delivering digital information and/or content, and any other similar device capable of unidirectionally or bidirectionally communicating content between content providers and platform 701 and/display 745, via network 753 or directly. It will be appreciated that the content may be communicated unidirectionally and/or bidirectionally to and from any one of the components in system 700 and a content provider via network 753. Examples of content may include any media information including, for example, video, music, medical and gaming information, and so forth.

Content services device(s) 748 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 701 may receive control signals from navigation controller 750 having one or more navigation features. The navigation features of navigation controller 750 may be used to interact with a user interface 754, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 750 may be echoed on a display (e.g., display 745) by movements of a pointer, cursor, focus ring, or other visual indicators displayed on the display. For example, under the control of software applications 751, the navigation features located on navigation controller 750 may be mapped to virtual navigation features displayed on user interface 754. In embodiments, navigation controller 750 may not be a separate component but integrated into platform 701 and/or display 745. Embodiments, however, are not limited to the elements or in the context shown or described herein.

In embodiments, drivers (not shown) may include technology to enable users to instantly turn on and off platform 701 like a television with the touch of a button after initial boot-up, when enabled, for example. Program logic may allow platform 701 to stream content to media adaptors or other content services device(s) 748 or content delivery device(s) 749 when the platform is turned "off." In addition, chip set 703 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 701 and content services device(s) 748 may be integrated, or platform 701 and content delivery device(s) 749 may be integrated, or platform 701, content services device(s) 748, and content delivery device(s) 749 may be integrated, for example. In various embodiments, platform 701 and display 745 may be an integrated unit. Display 745 and content service device(s) 748 may be integrated, or display 745 and content delivery device(s) 749 may be integrated, for example. These examples are not meant to limit the disclosed subject matter.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 701 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
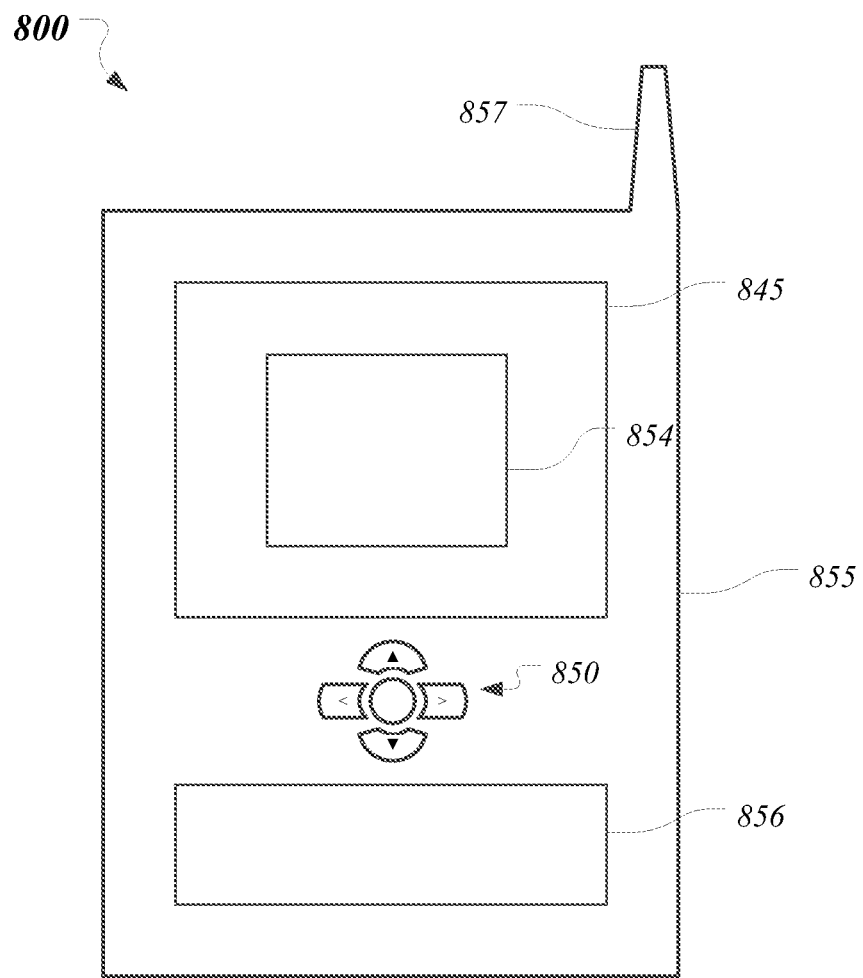
FIG. 8 illustrates one embodiment of a device.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a display 845, a navigation controller 850, a user interface 854, a housing 855, an I/O device 856, and an antenna 857. Display 845 may include any suitable display unit for displaying information appropriate for a mobile computing device, and may be the same as or similar to display 745 in FIG. 7. Navigation controller 850 may include one or more navigation features which may be used to interact with user interface 854, and may be the same as or similar to navigation controller 750 in FIG. 7. I/O device 856 may include any suitable I/O device for entering information into a mobile computing device. Examples for I/O device 856 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a data indexing apparatus, comprising: a multicore processor element; an assignment component for execution by the multicore processor element to generate a plurality of block-attribute pairs, each block-attribute pair corresponding to an attribute value and one of a plurality of data blocks; and an indexing component for execution by the multicore processor element to generate an index block for the plurality of data blocks based on the plurality of block-attribute pairs, the indexing component to perform parallel indexing of the plurality of block-attribute pairs using multiple indexing instances.

In Example 2, each block-attribute pair of Example 1 may optionally comprise a data block number and an attribute value number.

In Example 3, the indexing component of any one of Examples 1 to 2 may optionally be for execution by the multicore processor element to place each block-attribute pair in one of a plurality of queues.

In Example 4, each block-attribute pair of Example 3 may optionally comprise an attribute value number, and the indexing component may optionally be for execution by the multicore processor element to place each block-attribute pair in one of the plurality of queues based on the attribute value number comprised in that block-attribute pair.

In Example 5, each of the plurality of indexing instances of any one of Examples 3 to 4 may optionally index block-attribute pairs from a respective one of the plurality of queues.

In Example 6, the assignment component of any one of Examples 1 to 5 may optionally be for execution by the multicore processor element to establish multiple assignment instances and perform parallel generation of multiple block-attribute pairs using the multiple assignment instances.

In Example 7, the assignment component of Example 6 may optionally be for execution by the multicore processor element to establish each of the multiple assignment instances on a respective one of a plurality of processing cores of the multicore processor element.

In Example 8, the assignment component of any one of Examples 1 to 7 may optionally be for execution by the multicore processor element to assign a respective data block number to each of the plurality of data blocks.

In Example 9, the index block of any one of Examples 1 to 8 may optionally comprise a partitioned bitmap index.

In Example 10, the multicore processor element of Example 9 may optionally comprise a cache, and the indexing component may optionally be for execution by the multicore processor element to store portions of the partitioned bitmap index in the cache.

In Example 11, the data indexing apparatus of Example 10 may optionally comprise a reordering component for execution by the multicore processor element to reorder the portions of the partitioned bitmap index for sequential storage in contiguous memory locations of a storage device.

In Example 12, the data indexing apparatus of any one of Examples 1 to 11 may optionally comprise a tracking component for execution by the multicore processor element to maintain data block information describing the plurality of data blocks.

In Example 13, the data block information of Example 12 may optionally comprise a respective unique data block identifier for each of the plurality of data blocks.

In Example 14, the data block information of any one of Examples 12 to 13 may optionally comprise a respective unique data block number for each of the plurality of data blocks.

In Example 15, the tracking component of any one of Examples 12 to 14 may optionally be for execution by the multicore processor element to maintain attribute value information describing a plurality of attribute values, and each block-attribute pair may optionally correspond to one of the plurality of attribute values.

In Example 16, the attribute value information of Example 15 may optionally comprise a respective unique attribute value identifier for each of the plurality of attribute values.

In Example 17, the attribute value information of any one of Examples 15 to 16 may optionally comprise a respective unique attribute value number for each of the plurality of attribute values.

In Example 18, the tracking component of any one of Examples 12 to 17 may optionally be for execution by the multicore processor element to maintain index block information identifying a plurality of index blocks that have been generated by the indexing component.

In Example 19, the index block information of Example 18 may optionally comprise a respective unique index block identifier for each of the plurality of index blocks.

In Example 20, the index block information of any one of Examples 18 to 19 may optionally comprise a respective unique index block number for each of the plurality of index blocks.

Example 21 is a system, comprising: an apparatus according to any one of Examples 1 to 20; a display; a radio frequency (RF) transceiver; and one or more RF antennas.

Example 22 is a data indexing method, comprising: generating, by a multicore processor element, a plurality of block-attribute pairs based a plurality of data blocks; placing each of the plurality of block-attribute pairs in one of multiple queues based on an attribute value number in that block-attribute pair; and generating an index block for the plurality of data blocks by indexing the plurality of block-attribute pairs using multiple indexing instances.

In Example 23, the index block of Example 22 may optionally comprise a partitioned bitmap index.

In Example 24, the data indexing method of any one of Examples 22 to 23 may optionally comprise indexing multiple block-attribute pairs in parallel using the multiple indexing instances.

In Example 25, the data indexing method of any one of Examples 22 to 24 may optionally comprise: performing a modulo operation on the attribute value number in each block-attribute pair; and assigning each block-attribute pair to one of the multiple queues based on a result of the modulo operation for the attribute value number in that block-attribute pair.

In Example 26, each of the multiple indexing instances of any one of Examples 22 to 25 may optionally correspond to a respective one of the multiple queues.

In Example 27, the data indexing method of any one of Examples 22 to 26 may optionally comprise establishing each of the multiple indexing instances on a different respective processing core of the multicore processor.

In Example 28, the data indexing method of any one of Examples 22 to 27 may optionally comprise: establishing multiple assignment instances; and assigning each of the plurality of block-attribute pairs to one of the multiple queues using one of the multiple assignment instances.

In Example 29, the data indexing method of Example 28 may optionally comprise establishing each of the multiple assignment instances on a different respective processing core of the multicore processor.

In Example 30, each block-attribute pair of any one of Examples 22 to 29 may optionally comprise a data block number associated with one of the plurality of data blocks.

In Example 31, the data indexing method of any one of Examples 22 to 30 may optionally comprise assigning a respective data block number to each of the plurality of data blocks.

In Example 32, the data indexing method of Example 23 may optionally comprise storing portions of the partitioned bitmap index in a cache.

In Example 33, the data indexing method of Example 32 may optionally comprise reordering the portions of the partitioned bitmap index for sequential storage in contiguous memory locations of a storage device.

In Example 34, the data indexing method of any one of Examples 22 to 33 may optionally comprise maintaining data block information describing the plurality of data blocks.

In Example 35, the data block information of Example 34 may optionally comprise a respective unique data block identifier for each of the plurality of data blocks.

In Example 36, the data block information of any one of Examples 34 to 35 may optionally comprise a respective unique data block number for each of the plurality of data blocks.

In Example 37, the data indexing method of any one of Examples 22 to 36 may optionally comprise maintaining attribute value information describing a plurality of attribute values, and each block-attribute pair may optionally correspond to one of the plurality of attribute values.

In Example 38, the attribute value information of Example 37 may optionally comprise a respective unique attribute value identifier for each of the plurality of attribute values.

In Example 39, the attribute value information of any one of Examples 37 to 38 may optionally comprise a respective unique attribute value number for each of the plurality of attribute values.

In Example 40, the data indexing method of any one of Examples 22 to 39 may optionally comprise maintaining index block information identifying a plurality of index blocks.

In Example 41, the index block information of Example 40 may optionally comprise a respective unique index block identifier for each of the plurality of index blocks.

In Example 42, the index block information of any one of Examples 40 to 41 may optionally comprise a respective unique index block number for each of the plurality of index blocks.

Example 43 is at least one machine-readable medium comprising a set of data indexing instructions that, in response to being executed on a computing device, cause the computing device to perform a method according to any one of Examples 22 to 42.

Example 44 is an apparatus, comprising means for performing a data indexing method according to any one of Examples 22 to 42.

Example 45 is a system, comprising: an apparatus according to Example 44; a display; a radio frequency (RF) transceiver; and one or more RF antennas.

Example 46 is at least one machine-readable medium comprising a set of data indexing instructions that, in response to being executed on a computing device, cause the computing device to implement an apparatus or system according to Example 44 or 45.

Example 47 is a data indexing apparatus, comprising: means for generating, by a multicore processor element, a plurality of block-attribute pairs based a plurality of data blocks; means for placing each of the plurality of block-attribute pairs in one of multiple queues based on an attribute value number in that block-attribute pair; and means for generating an index block for the plurality of data blocks by indexing the plurality of block-attribute pairs using multiple indexing instances.

In Example 48, the index block of Example 47 may optionally comprise a partitioned bitmap index.

In Example 49, the data indexing apparatus of any one of Examples 47 to 48 may optionally comprise means for indexing multiple block-attribute pairs in parallel using the multiple indexing instances.

In Example 50, the data indexing apparatus of any one of Examples 47 to 49 may optionally comprise: means for performing a modulo operation on the attribute value number in each block-attribute pair; and means for assigning each block-attribute pair to one of the multiple queues based on a result of the modulo operation for the attribute value number in that block-attribute pair.

In Example 51, each of the multiple indexing instances of any one of Examples 47 to 50 may optionally correspond to a respective one of the multiple queues.

In Example 52, the data indexing apparatus of any one of Examples 47 to 51 may optionally comprise means for establishing each of the multiple indexing instances on a different respective processing core of the multicore processor.

In Example 53, the data indexing apparatus of any one of Examples 47 to 52 may optionally comprise: means for establishing multiple assignment instances; and means for assigning each of the plurality of block-attribute pairs to one of the multiple queues using one of the multiple assignment instances.

In Example 54, the data indexing apparatus of Example 53 may optionally comprise means for establishing each of the multiple assignment instances on a different respective processing core of the multicore processor.

In Example 55, each block-attribute pair of any one of Examples 47 to 54 may optionally comprise a data block number associated with one of the plurality of data blocks.

In Example 56, the data indexing apparatus of any one of Examples 47 to 55 may optionally comprise means for assigning a respective data block number to each of the plurality of data blocks.

In Example 57, the data indexing apparatus of Example 48 may optionally comprise means for storing portions of the partitioned bitmap index in a cache.

In Example 58, the data indexing apparatus of Example 57 may optionally comprise means for reordering the portions of the partitioned bitmap index for sequential storage in contiguous memory locations of a storage device.

In Example 59, the data indexing apparatus of any one of Examples 47 to 58 may optionally comprise means for maintaining data block information describing the plurality of data blocks.

In Example 60, the data block information of Example 59 may optionally comprise a respective unique data block identifier for each of the plurality of data blocks.

In Example 61, the data block information of any one of Examples 59 to 60 may optionally comprise a respective unique data block number for each of the plurality of data blocks.

In Example 62, the data indexing apparatus of any one of Examples 47 to 61 may optionally comprise means for maintaining attribute value information describing a plurality of attribute values, and each block-attribute pair may optionally correspond to one of the plurality of attribute values.

In Example 63, the attribute value information of Example 62 may optionally comprise a respective unique attribute value identifier for each of the plurality of attribute values.

In Example 64, the attribute value information of any one of Examples 62 to 63 may optionally comprise a respective unique attribute value number for each of the plurality of attribute values.

In Example 65, the data indexing apparatus of any one of Examples 47 to 64 may optionally comprise means for maintaining index block information identifying a plurality of index blocks.

In Example 66, the index block information of Example 65 may optionally comprise a respective unique index block identifier for each of the plurality of index blocks.

In Example 67, the index block information of any one of Examples 65 to 66 may optionally comprise a respective unique index block number for each of the plurality of index blocks.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a multicore processor element;
an assignment component for execution by the multicore processor element to:
generate a plurality of block-attribute pairs, each block-attribute pair corresponding to an attribute value and one of a plurality of data blocks; and
an indexing component for execution by the multicore processor element to:
place each of the plurality of block-attribute pairs in one of multiple queues based on an attribute value number in that block-attribute pair;
generate an index block for the plurality of data blocks based on the plurality of block-attribute pairs, the index block comprising a partitioned bitmap index, a first data block number, a last data block number, and a last attribute value identifier; and
perform parallel indexing of the plurality of block-attribute pairs in the multiple queues using multiple indexing instances, wherein each indexing instance is configured to retrieve block-attribute pairs from the corresponding one of the multiple queues and update the partitioned bitmap index based on the retrieved block-attribute pairs.

2. The apparatus of claim 1, each block-attribute pair comprising a data block number and an attribute value number, the first data block number and last data block number comprising a respective one of the data block numbers, the generated index block for data blocks having data block numbers in a range of data block numbers defined by the first and last data block numbers.

3. The apparatus of claim 1, the last attribute value identifier corresponding to a largest value of the attribute value numbers, the bitmap index of the index block specifying attribute values having an attribute value number less than the last attribute value identifier.

4. The apparatus of claim 1, each indexing instance of the plurality of indexing instances configured to index block-attribute pairs from a respective one of the multiple queues, the bitmap index comprising a plurality of rows, each row of the bitmap index indexed by one of the indexing instances of the plurality of indexing instances.

5. The apparatus of claim 1, the assignment component for execution by the multicore processor element to establish multiple assignment instances and perform parallel generation of multiple block-attribute pairs using the multiple assignment instances.

6. The apparatus of claim 5, the assignment component for execution by the multicore processor element to establish each of the multiple assignment instances on a respective one of a plurality of processing cores of the multicore processor element.

7. The apparatus of claim 1, the assignment component for execution by the multicore processor element to assign a respective data block number to each of the plurality of data blocks.

8. The apparatus of claim 1, comprising a reordering component for execution by the multicore processor element to reorder the partitioned bitmap index for sequential storage in contiguous memory locations of a storage device.

9. At least one non-transitory machine-readable medium comprising a set of instructions that, in response to being executed on a computing device, cause the computing device to:
generate a plurality of block-attribute pairs based a plurality of data blocks;
place each of the plurality of block-attribute pairs in one of multiple queues based on an attribute value number in that block-attribute pair;
generate an index block for the plurality of data blocks by indexing the plurality of block-attribute pairs using multiple indexing instances, the index block comprising a partitioned bitmap index, a first data block number, a last data block number, and a last attribute value identifier; and
perform parallel indexing of the plurality of block-attribute pairs in the multiple queues using multiple indexing instances, wherein each indexing instance is configured to retrieve block-attribute pairs from the corresponding one of the multiple queues and update the partitioned bitmap index based on the retrieved block-attribute pairs.

10. The at least one non-transitory machine-readable medium of claim 9, comprising instructions that, in response to being executed on the computing device, cause the computing device to:
perform a modulo operation on the attribute value number in each block-attribute pair; and
assign each block-attribute pair to one of the multiple queues based on a result of the modulo operation for the attribute value number in that block-attribute pair, wherein each block-attribute pair comprises a data block number and an attribute value number, wherein the first data block number and last data block number comprise a respective one of the data block numbers, wherein the index block is for data blocks having data block numbers in a range of data block numbers defined by the first and last data block numbers.

11. The at least one non-transitory machine-readable medium of claim 9, each of the multiple indexing instances corresponding to a respective one of the multiple queues, the last attribute value identifier corresponding to a largest value of the attribute value numbers, the bitmap index of the index block specifying attribute values having an attribute value number less than the last attribute value identifier.

12. The at least one non-transitory machine-readable medium of claim 9, comprising instructions that, in response to being executed on the computing device, cause the computing device to establish each of the multiple indexing instances on a different respective processing core of a multicore processor, the bitmap index comprising a plurality of rows, each row of the bitmap index indexed by one of the indexing instances of the plurality of indexing instances.

13. The at least one non-transitory machine-readable medium of claim 9, comprising instructions that, in response to being executed on the computing device, cause the computing device to:
establish multiple assignment instances; and
assign each of the plurality of block-attribute pairs to one of the multiple queues using one of the multiple assignment instances.

14. The at least one non-transitory machine-readable medium of claim 13, comprising instructions that, in response to being executed on the computing device, cause the computing device to establish each of the multiple assignment instances on a different respective processing core of a multicore processor.

15. The at least one non-transitory machine-readable medium of claim 9, comprising instructions that, in response to being executed on the computing device, cause the computing device to assign a respective data block number to each of the plurality of data blocks.

16. The at least one non-transitory machine-readable medium of claim 9, comprising instructions that, in response to being executed on the computing device, cause the computing device to reorder the partitioned bitmap index for sequential storage in contiguous memory locations of a storage device.

17. A method, comprising:
generating, by a multicore processor element, a plurality of block-attribute pairs based a plurality of data blocks;
placing each of the plurality of block-attribute pairs in one of multiple queues based on an attribute value number in that block-attribute pair;
generating an index block for the plurality of data blocks by indexing the plurality of block-attribute pairs using multiple indexing instances, the index block comprising a partitioned bitmap index, a first data block number, a last data block number, and a last attribute value identifier; and
performing parallel indexing of the plurality of block-attribute pairs in the multiple queues using multiple indexing instances, wherein each indexing instance is configured to retrieve block-attribute pairs from the corresponding one of the multiple queues and update the partitioned bitmap index based on the retrieved block-attribute pairs.

18. The method of claim 17, each block-attribute pair comprising a data block number and an attribute value number, the first data block number and last data block number comprising a respective one of the data block numbers, the index block for data blocks having data block numbers in a range of data block numbers defined by the first and last data block numbers, the method comprising:
performing a modulo operation on the attribute value number in each block-attribute pair; and
assigning each block-attribute pair to one of the multiple queues based on a result of the modulo operation for the attribute value number in that block-attribute pair.

19. The method of claim 17, each of the multiple indexing instances corresponding to a respective one of the multiple queues, the last attribute value identifier corresponding to a largest value of the attribute value numbers, the bitmap index of the index block specifying attribute values having an attribute value number less than the last attribute value identifier.

20. The method of claim 17, comprising establishing each of the multiple indexing instances on a different respective processing core of the multicore processor, the bitmap index comprising a plurality of rows, each row of the bitmap index indexed by one of the indexing instances of the plurality of indexing instances.

21. The method of claim 17, comprising:
    establishing multiple assignment instances; and
    assigning each of the plurality of block-attribute pairs to one of the multiple queues using one of the multiple assignment instances.

22. The method of claim 17, comprising assigning a respective data block number to each of the plurality of data blocks.

23. The method of claim 17, comprising reordering the partitioned bitmap index for sequential storage in contiguous memory locations of a storage device.

\* \* \* \* \*